United States Patent [19]

Coffey

[11] 4,178,060

[45] Dec. 11, 1979

[54] MOUNT FOR A COMMUNICATION DEVICE OR THE LIKE

[76] Inventor: James G. Coffey, 2516 Lee Ave. No., Minneapolis, Minn. 55418

[21] Appl. No.: 891,514

[22] Filed: Mar. 30, 1978

[51] Int. Cl.² .......................... H01R 9/16; H02B 1/02
[52] U.S. Cl. .............................. 339/125 R; 339/217 R
[58] Field of Search ............. 339/75 M, 91 R, 119 R, 339/49 R; 248/203; 70/58, DIG. 57

[56] References Cited

U.S. PATENT DOCUMENTS

| | | | |
|---|---|---|---|
| 3,467,942 | 9/1969 | Dell et al. | 339/49 R |
| 3,513,478 | 5/1970 | Kemper et al. | 339/91 R |

*Primary Examiner*—E. F. Desmond

*Attorney, Agent, or Firm*—Wicks & Nemer

[57] ABSTRACT

A mount for a communication device such as a C.B. radio, a cassette player and the like including an upper plate for connection with a base member and a lower plate for connection with the item to be mounted. The upper plate has a flange mounted on each side thereof engageable with a flange mounted on each side of the lower plate when said lower plate is slidably mounted on said upper plate. The upper plate has an electrical terminal block mounted on the underside thereof having means for mating engagement for wire connectors with wire connectors of an electrical terminal block mounted on the upper side of the lower plate when the lower plate is slidably mounted on the upper plate.

3 Claims, 8 Drawing Figures

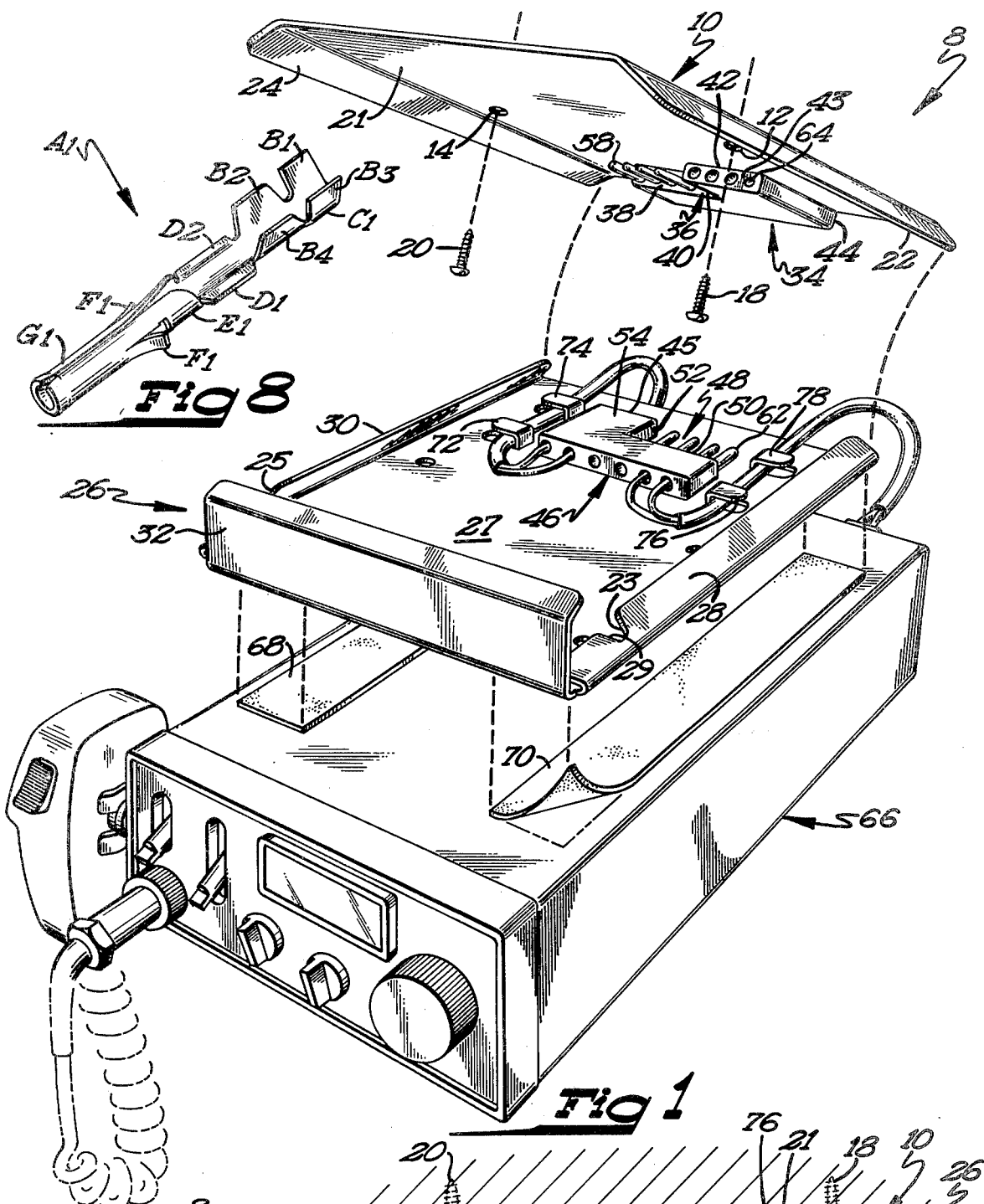

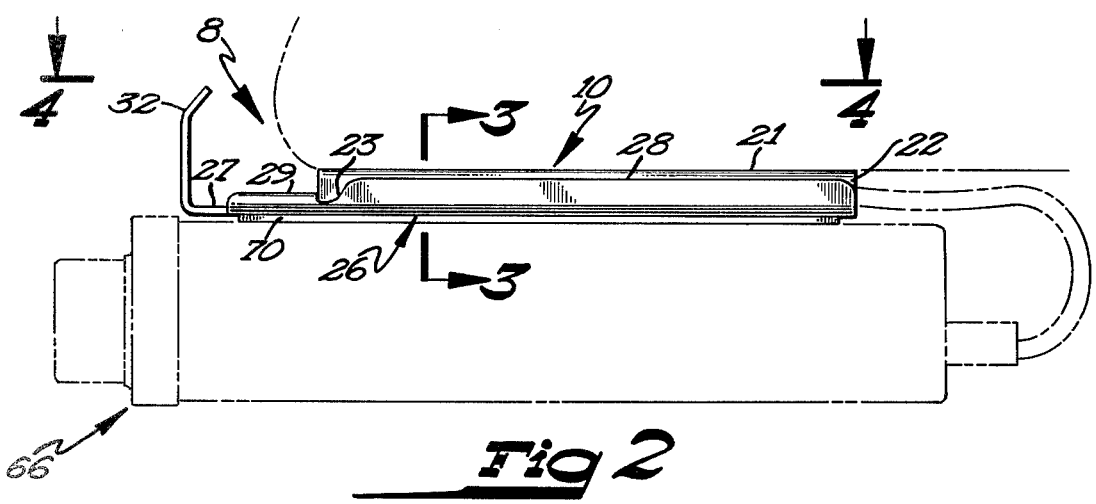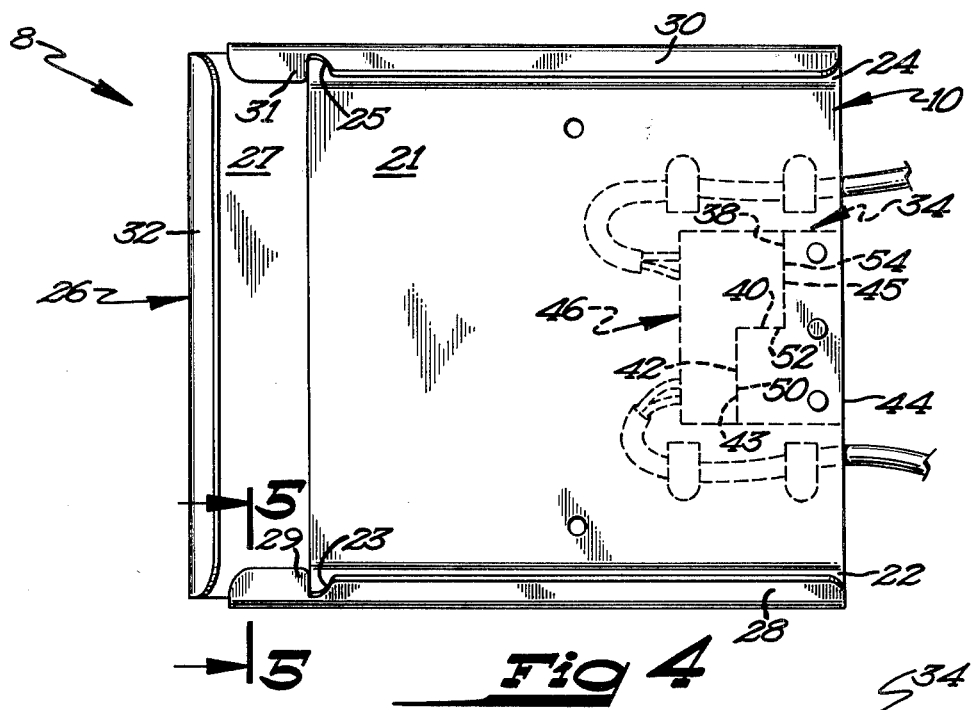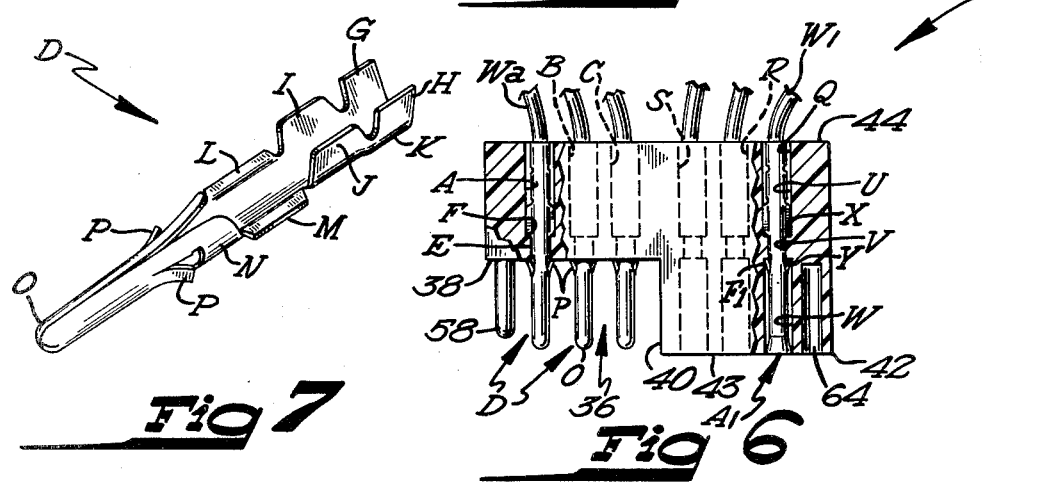

MOUNT FOR A COMMUNICATION DEVICE OR THE LIKE

SUMMARY

The invention relates generally to an improvement in a device for removably mounting a communication device such as a C.B. radio, a cassette player or the like at a point under the dash of an automobile which requires a source of electrical power.

It is an object of the invention to provide a device for removably mounting a communication device or the like which automatically makes the necessary easy and positive electrical connection between the item to be mounted and the source of power as the device is mounted.

It is a further object of the invention to provide an upper plate for connection with the dash of an automobile and a lower plate for connection with the item to be mounted. The lower plate has opposed flanges thereon which slidably engage with opposed flanges on the upper plate. It is an additional object of the invention to provide an upper plate having an electrical terminal block which engages with an electrical terminal block carried by the lower plate when the lower plate is slidably mounted on the upper plate. It is also an object to provide holes in each of said terminal blocks for receiving male and female connectors in secured position against displacement whereby the male and female connectors engage when the terminal blocks engage.

The invention will appear more clearly from the following detailed description when taken in connection with the accompanying drawings, showing by way of example a preferred embodiment of the inventive idea wherein like numerals refer to like parts throughout.

In the drawings forming part of this application:

FIG. 1 is an exploded perspective view of a slide mount for a communication device and the like embodying the invention.

FIG. 2 is a side elevational view of the slide mount with a C.B. radio and support therefor illustrated in broken lines.

FIG. 3 is a sectional view on the line 3—3 of FIG. 2.

FIG. 4 is a top plan view of the slide mount.

FIG. 5 is a sectional view on the line 5—5 of FIG. 4.

FIG. 6 is a top plan view of a terminal block, portions thereof being in section.

FIG. 7 is a perspective view of the male connector.

FIG. 8 is a perspective view of the female connector.

Referring to the drawings in detail, the slide mount 8 includes the upper plate 10 formed with the holes 12 and 14 for securement of the plate to the support 16, such as the dashboard of an automobile, by means of the metal screws 18 and 20. The plate 10 includes the flat central body portion 21 which is substantially rectangular in outline and has formed at one edge thereof the first outwardly, downwardly and angularly disposed guide flange 22. The parallely opposed edge of the central body portion is formed with the second outwardly, downwardly and angularly disposed guide flange 24.

The numeral 26 designates a lower plate which includes the flat central body portion 27 which is substantially rectangular in outline and has formed at one edge thereof the first inwardly, upwardly and angularly disposed guide flange 28. The parallely opposed edge of the central body portion is formed with the second inwardly, upwardly and angularly disposed guide flange 30. The forward edge of the flat body portion 27 is formed with the upturned lip 32. The guide flanges 28 and 30 are each formed with the cut out 23 and 25 and turned down stop shoulder 29 and 31, respectively, on the outer end thereof.

The guide flanges 22 and 24 are so disposed on the upper plate 10, and the guide flanges 28 and 30 are so disposed on the lower plate 26 that the flanges 22 and 24 of the upper plate slip under and in sliding and locking contact with the flanges 28 and 30, respectively, when the plate 26 is slidably moved onto the stationary plate 10 for mounting thereon. When the plate 26 is slidably mounted onto the plate 10 it is limited and properly positioned by the stop shoulders 29 and 31.

Secured to the underside of the upper plate is the substantially flat first and upper electrical terminal block 34 formed with the right angular recess 36 including the edge 38 which terminates in the right angular edge 40. The recess 36 forms the projection 42 having the forward edge 43 parallely disposed to the rear edge 44. The edge 38 acts as a shoulder as hereinafter referred to.

The terminal block 34 includes three identical insert holes A, B and C in each of which an identical male connector D is securely positioned. The hole A terminates internally of the block in the reduced hole portion E which produces the cylindrical internal shoulder F. The conventional male connector D includes the crimp tabs G, H, I and J extending from a half tubular formation K from which extends the radially disposed side flanges L and M. The half tubular formation terminates in the semi-tubular portion N that terminates in the tubular end portion O. The tubular portion O has the barbs P extending outwardly therefrom. The wire Wa is crimped between the tabs G, H, I and J.

The male connector D is securely mounted in the block 34 by inserting the end portion O into hole portion A until the barbs P are outwardly of and upon the shoulder edge 38 simultaneously with the ends of the side flanges L and M in engagement with the cylindrical shoulder F. As a result the connector D is simple and easily locked into place on the block 34. The other two male connectors identical to connector D are locked into holes B and C in the same manner, the holes B and C being identical to hole A.

The block 34 includes three further identical insert holes Q, R and S in each of which an identical female connector A1 is securely positioned. The hole Q has a first tubular portion U which terminates in a reduced tubular portion V which in turn terminates in a second tubular portion W whereby the first internal annular shoulder X is formed and a second internal annular shoulder Y is formed.

The conventional female connector A1 includes the crimp tabs B1, B2, B3 and B4 extending from a half tubular formation C1 from which extends the radially disposed side flanges D1 and D2. The half tubular formation C1 terminates in the semi-tubular portion E1. The tubular portion E1 has the barbs F1 extending outwardly therefrom and it terminates in the tubular end G1 open at the outer end thereof. The wire W1 is crimped between tabs B1, B2, B3 and B4.

The female connector A1 is securely mounted in the block 34 by inserting the end portion G1 into the hole Q until the barbs F1 engage the shoulder Y simultaneously with the ends of the side flanges D1 and D2 in engagement with the shoulder X. As a result the female connector A1 is simply and securely locked into place on the block 34. Two female connectors identical to connector A1 are locked into holes R and S in the same manner. Holes R and S are identical to hole Q. Male and female connectors such as D and A1 are mounted in the terminal block 46 as in block 34.

The numeral 46 designates a second and lower substantially flat electrical terminal block formed with the right angular recess 48 including the edge 50 which terminates in the right angular edge 52. The recess 48 forms the projection 54 having the rear edge 45. The block 46 is secured to the top of the body portion 27 of the lower plate by conventional means.

The edge 38 of the block 34 has the positioning pin 58 extending at a right angle therefrom and receivable in a hole 60 formed in the block 46, and the edge 50 of the block 46 has the positioning pin 62 extending at a right angle therefrom and receivable in the hole 64 formed in the block 34. Male and female connectors such as D and A1 are mounted in the terminal block 46 in the same manner as in block 34.

The terminal blocks 34 and 48 have the necessary wires positioned therein equipped with connectors as above so that when the plate 26 is slid onto the plate 34 the blocks interfit as particularly shown in FIG. 4 with the connectors of block 34 connecting with connectors of block 48. The projection 42 of block 34 fits into recess 50 of block 46, and the projection 54 of block 46 fits into the recess 36 of block 34. Positive guiding and interfit of the blocks is aided by the pin 58 of block 34 engaging the hole 60 of block 46 and the pin 62 of block 48 engaging the hole of block 34. In each instance the end portion O of a male connector D is inserted into the hollow portion G1 of a female connector A1 whereby electrical connection is made between terminal blocks 34 and 46. Each time the plates 10 and 26 are slidably joined the wire connectors carried by each of the terminal blocks 34 and 46 are automatically cleaned by frictional engagement. The flat body portion 27 of upper plate 10 has punched therefrom the tabs 72, 74, 76 and 78 which are spaced from the plane of the flat body whereby wires, such as Wa and W1, are held in place under the tabs.

An item 66 such as a C.B. radio may be attached to the underside of the lower plate 26 by means of conventional adhesive strips 68 and 70 or the like and moved from an operational position substantially under the plate 10 to a removed positioned by pulling outwardly on the lip 32 as the plate 26 with the item 66 thereon is pulled outwardly, the terminal blocks are automatically disconnected. The extent of push in of the C.B. radio on the stationary plate 10 is limited by the stop shoulders 29 and 31 engaging the forward edge of the plate 10.

With the above described device tne C.B. unit 66 may be easily and quickly mounted and dismounted for use. The construction and unique mounting of the terminal blocks guarantees easy and positive connection of the wires necessary for the operation of the unit that is mounted.

Having thus described the invention, what is claimed as new and desired to be secured by Letters Patent is:

1. A mount for a C.B. radio and the like having an upper plate and a lower plate slidably mounted thereon, said upper plate having a first terminal block and said lower plate having a second terminal block for mating engagement with said first terminal block, each of said terminal blocks having a male and female connector for interconnection when said terminal blocks are mated, each of said blocks having a hole in which each of said connectors is positioned, each of said male and female connectors having a pair of oppositely disposed barbs extending therefrom and a pair of oppositely disposed flanges spaced from said barbs and extending from said connector, the improvement in said terminal block, said improvement including
   (a) said terminal block having means adjacent each of said holes for engagement with said barbs of each of said connectors and simultaneously with said flanges when said connectors are inserted in said holes.

2. The device of claim 1 in which said engagement means includes first and second opposed shoulders spaced a distance substantially equal to the spaced distance between said barbs and said flanges.

3. The terminal block of claim 2 in which said first shoulders are internally of a terminal block and said second shoulders are externally of a terminal block.

* * * * *